March 25, 1958   F. C. TEA, JR   2,827,843
MARKER ACTUATING ARRANGEMENT FOR PLANTER
Filed June 12, 1956   2 Sheets-Sheet 1
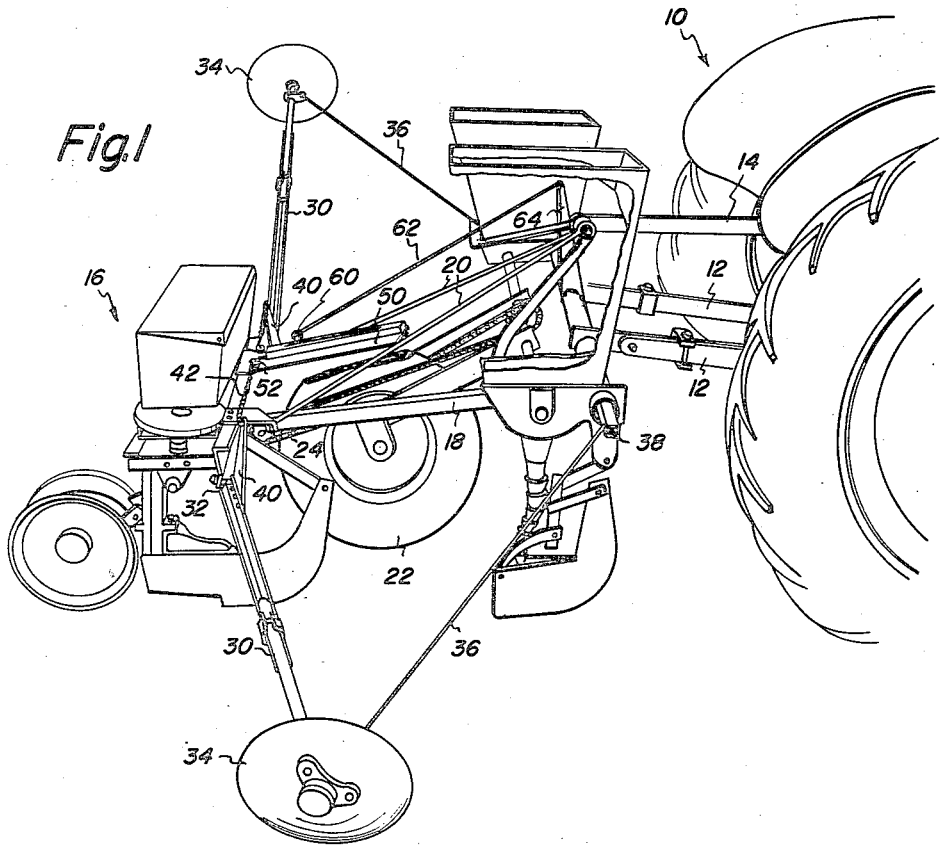
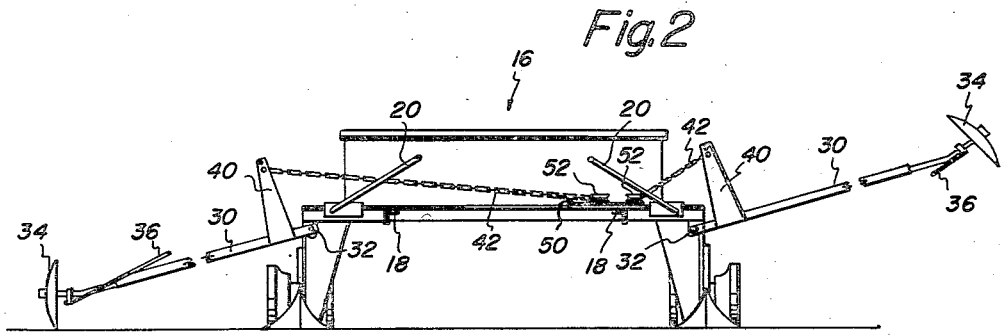
INVENTOR.
FRANK TEA Jr.
BY
ATTORNEYS March 25, 1958  F. C. TEA, JR  2,827,843
MARKER ACTUATING ARRANGEMENT FOR PLANTER
Filed June 12, 1956  2 Sheets-Sheet 2

INVENTOR.
BY FRANK TEA Jr.
ATTORNEYS

United States Patent Office 2,827,843
Patented Mar. 25, 1958

2,827,843

MARKER ACTUATING ARRANGEMENT FOR PLANTER

Frank C. Tea, Jr., Bellevue, Ohio

Application June 12, 1956, Serial No. 590,916

6 Claims. (Cl. 97—230)

This invention relates to planters and the like; particularly to planters that plant in rows such as corn planters and the like, and to devices associated therewith for marking the next adjacent row to be planted. More particularly still, this invention relates to an automatic arrangement for actuating the markers of such a planter so that the proper marker is always down in effective position while the other marker is elevated to its ineffective position.

In the operation of corn planters and the like, the markers are normally manually operated, so that after a field has been traversed once and the planter is turned around and is ready to start its return travel across the field, the marker that was previously down is lifted to elevated position since it is now on the planted side of the planter, and the marker that was formerly up is lowered into effective position since it is now on the unplanted side of the planter. Furthermore, during the turning of the planter both markers must be elevated in order to provide for free manipulation of the planter without the danger of damaging the marker or supporting structure therefor.

With the introduction of power-operated equipment, such as tractor-drawn planters, particularly with lift hitches, the speed of operation of all of the equipment was greatly increased; and, while the work of planting and the manipulating of the planter at the end of the row in order to turn about was greatly reduced, the manual operation of the markers was still retained.

With the greater speed of operation, it became a much simpler matter to forget to raise the markers, and damage to the markers and supporting structure became quite frequent. According to the present invention, the foregoing drawbacks are entirely overcome by providing an arrangement whereby the markers associated with a planter are automatically lifted off the planter whenever the planter is lifted from the ground, whereby there is absolutely no danger that the markers or the supporting structure therefor will be in the least damaged during the turning of the tractor and planter at the end of a row.

The present invention also contemplates the provision of an automatic arrangement for lowering the proper marker automatically after the planter has been lifted, and is then again lowered into working position after the planter and the tractor have been manipulated into proper position for commencing a new pass across the field.

The present invention also has, as a still further object, an embodiment of mechanism for accompanying the foregoing in a relatively simple and inexpensive structure adapted for forming a part of new equipment, and also adapted for being added to existing equipment.

A still further object of the present invention is the provision of an automatic marker actuating arrangement such as referred to which is reliable in operation.

A still further object is the provision of an automatic marker actuating device in which the one of the markers which is in lowered position can quite simply be changed at any time should this be necessary for any reason.

These and other objects and advantages of this invention will become more apparent upon reference to the following specification taken in connection with the accompanying drawings, wherein:

Figure 1 is a perspective view showing a planter and fertilizer distributor embodying a marker-actuating device according to the present invention;

Figure 2 is a more or less diagrammatic front elevated view of a planter showing the view of the manner in which the markers are attached thereto, and are adapted for being raised and lowered thereon;

Figure 3:
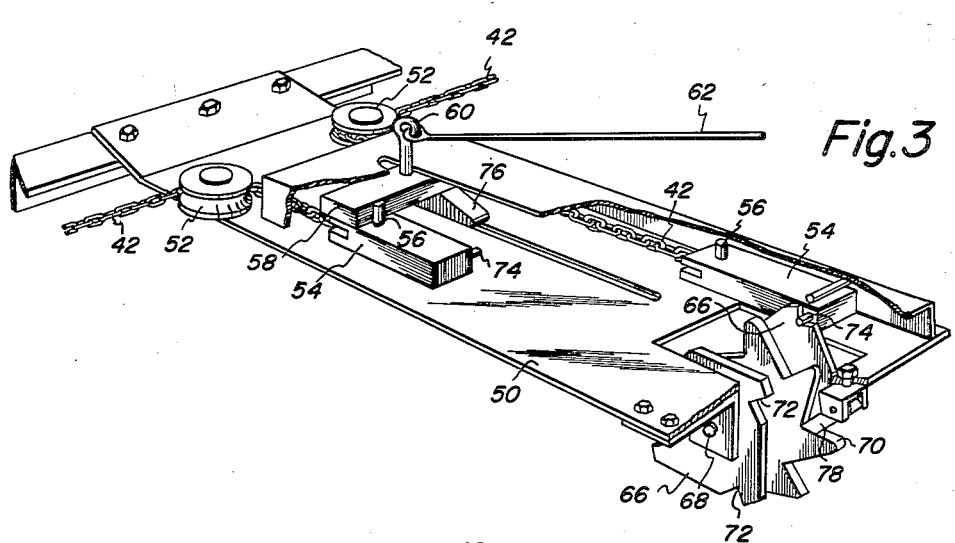
Figure 3 is a perspective view showing the marker-actuating mechanism in the position it occupies when the planter is down in working position.

Referring to the drawings somewhat more in detail, Figure 1 illustrates a planter and fertilizer distributor combination with the planter having a marking system associated therewith according to the present invention.

In Figure 1, the fertilizer distributor and planter combination is attached to a tractor generally indicated at 10 by a lift-type hitch arrangement comprising the laterally spaced lower bars 12 and an upper bar 14. A tripod arrangement associated with the frame of the fertilizer distributor is adapted for connecting with the ends of the bars so that when the bars are raised the fertilizer distributor unit will be lifted from the ground in substantial parallelism therewith in a manner which is well known in the art.

The planter unit 16 which is arranged in trailing-relation with the fertilizer distributor unit is connected therewith by means of intermediate tension elements 18 that connect the frame of the planter unit rigidly with the frame of the fertilizer distributor. From adjacent the outer ends of the frame of the planter, there are rods 20 extending inwardly and upwardly to connect with an upper portion of the aforementioned tripod structure associated with the frame of the fertilizer distributor unit. In this manner, whenever the fertilizer distributor unit is elevated by operating the tractor hitch, the planter unit is also elevated.

Power for operating the fertilizer distributor unit and the planter unit may be obtained from a ground wheel 22 connected by a drive chain with the operating shaft of the fertilizer distributor unit, while a second chain 24 connects the drive shaft to the fertilizer distributor unit with the drive shaft of the planter unit.

The planter unit has a marker 30 on each side thereof, and each marker is pivoted at its inner end at 32 to an outer end of the planter frame. Each marker carries a disc 34, or some other suitable marking device, at its outer end. Each marker also has a guy element 36 attached to the outer end of the marker and extending forwardly to be pivotally connected at 38 to the frame of the fertilizer distributor unit. The structure provides for easy raising and lowering movements of the markers, while supporting the marking elements thereon against deflection during operation.

Each marker 30 has attached thereto adjacent its inner end, and upstanding therefrom, a bracket 40 that has connected thereto a flexible pull element 42 such as a flexible cable or chain or the like. The flexible elements 42 are availed of for raising and lowering the markers so that they can be made selectively effective since it is only the marker on the unplanted side of the planter that is utilized at any one time.

According to the present invention, means are provided for automatically actuating the flexible elements 42 so as to lift both markers when the planter and fertilizer unit is being carried in a lifted position, and for lowering the proper one of the markers after the planter has been turned at the end of a field and is positioned for making a new pass thereacross.

This automatic arrangement comprises a frame 50 connected to about the middle portion of the front edge of the frame of the planter unit and extending forwardly therefrom in a position where the ground wheel 22 will not cause any interference. Within frame 50 at the rear there is carried the rollers 52 about which the flexible elements 42 pass. Within frame 50 the ends of the flexible elements 42 are connected with the slide blocks 54. These blocks comprise upstanding pins 56 which are engageable from the planter side of the said pins by an actuating member 58 that has connected thereto an eye element 60.

Connected with eye element 60 and extending forwardly therefrom is an actuating pull rod 62. Pull rod 62 at its forward end connects with the upper end of a bracket element 64, which may be secured to one of the lower arms 12 of the tractor hitch so that when the planter and fertilizer distributor are raised the rod 62 and, therefore, eye 60 and actuating member 58 are pulled forwardly in frame 50, thus pushing slide blocks 54 forwardly within the frame, and pulling on flexible elements 42, thereby lifting both markers into their upper idle position.

Figure 4:
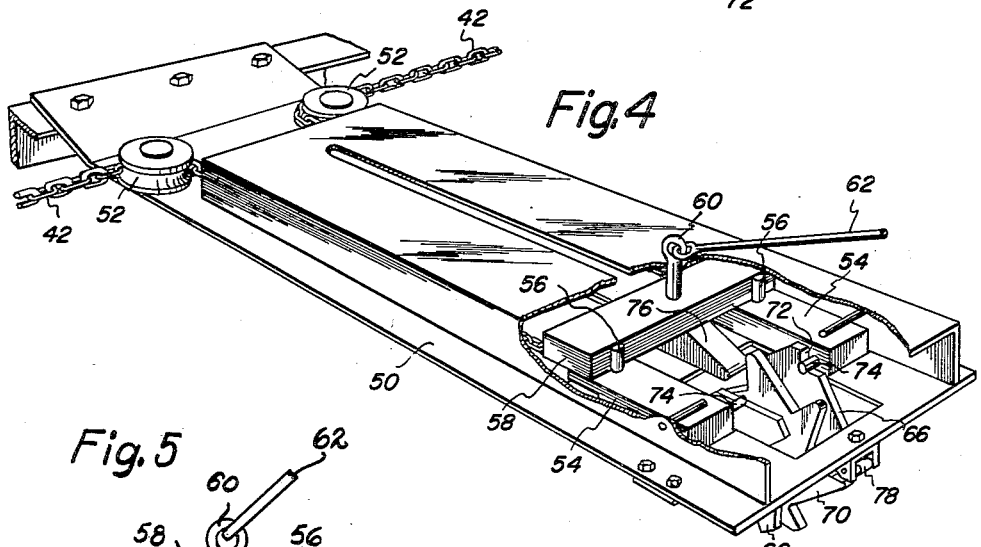
Figure 4 is a view, like Figure 3, but shows the actuating mechanism in the position it occupies as the planter approaches its uppermost lifted position.
Figure 5:
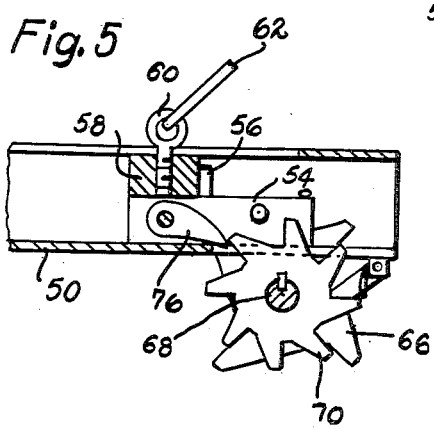
Figure 5 is a sectional view showing more in detail the construction of the ratchet mechanism at the front end of the frame.

According to the present invention, means are provided for selectively latching the slide blocks in their marker up positions. This means takes the form of a pair of latch plates 66, fixed to a shaft 68, that has also thereon a ratchet wheel 70. Figures 3 and 4 will indicate that each latch plate 66 has four effective detent surfaces 72 thereon, and that these surfaces are staggered relative to those on the other latch plate.

Further, ratchet plate 70 has eight teeth thereon so that by indexing the ratchet plate from one position to the next, the latch plates 66 will be alternately effective for latching their pertaining slide blocks in marker up position.

The above-described arrangement is effective by virtue of the pins 74 carried by the slide blocks and adapted for engagement by the detent surfaces of the latch plates, as may be seen in Figures 3 and 4. Indexing of the latch plates is accomplished by the pawl 76 connected with actuating member 58, which is so arranged that each time the planter unit is lifted the ratchet plate and, therefore, the shaft connected therewith and the latch plates is indexed 45 degrees.

A spring-loaded detent element 78 is provided with serves to retain the ratchet plate and latch plates in their indexed positions against the load of the elevated marker when the actuating member and the unlatched slide block return to their original position.

It will be apparent that the raising of the planter at the end of each row will automatically raise both markers, that when the planters then again set down only one of the markers will be lowered. This marker will be the one which is opposite the one which was previously lowered.

Should it be necessary to raise the planter to its highest position during a pass across the field, for any reason, it will be evident that the proper marker could be moved down merely by again raising and lowering the planter an extra time, thus bringing the same marker again to its down position.

From the foregoing, it will be evident that the arrangement I have provided is extremely simple and inexpensive, and is positive in operation at all times. The device can be supplied with new equipment, or can be applied as an accessory to existing equipment in a very simple manner.

I claim:

1. In combination: with a planter, a marker pivoted to each side of said planter, a flexible lift element connected with each marker and extending toward the center of said planter, roller means about which said elements pass and then extend in the fore and aft direction of the planter, a slide member connected to the end of each said element, an actuating block adapted for engaging both of said members, said actuating block being movable in response to elevating of said planter for moving said members to pull on said elements thereby moving both of said elements into marker-lifted position, latch means operable for engaging said members when in their marker-lifted positions, said latch means being effective for retaining only one of said members at a time; and means for indexing said latch means from one effective position to another in response to lifting of said planter.

2. In combination: a planter having markers pivoted to opposite sides thereof, flexible pull elements connected with said markers extending inwardly toward the center of the planter; roller means about which the said elements pass and then extend forwardly of the planter; a pull member connected with the end of each said element, a single actuating block adapted for abutting said members and moving them forwardly, thereby to pull the connected elements into marker-lifted position; a latch for each member adapted for engaging and retaining the member in marker-lifted position, said latches being adapted for being alternately effective; and means for indexing said latches into successive effective positions in response to lifting of said planter.

3. In combination with a planter having marker means pivotally connected with the opposite sides thereof, and flexible pull elements connected with said marker means and extending toward the center of the planter; an actuating unit for alternately actuating said elements comprising a frame connected at one end with the planter, rollers in the frame over which said elements pass; slide members in the frame to which the ends of said elements are connected, said members being side by side at the planter end of said frame when both markers are down, and being adjacent the other end of the frame when the markers are up; a single actuating member in the frame adapted for abutting said slide members from the planter side operable to move said members toward the said other end of the frame, said actuating member being connected to move forwardly in said frame in response to the lifting of said planter from working position; latch means at the said other end of the frame for engaging said slide members and retaining them in marker lifted position; and means associated with said actuating member operable for indexing said latch means each time the planter is lifted, whereby the latch means are alternately effective for retaining said slide members in their marker lifted positions.

4. In combination with a planter having markers pivoted to the sides thereof, and flexible marker lifter elements extending from the markers inwardly to the center of the planter and then about roller means toward the front of said planter, slide blocks connected to the ends of said elements, a frame in which such slide blocks are slidably mounted, an actuating member in the frame adapted for engaging said slide blocks from the planter side thereof and for moving the blocks forwardly in the frame to lift the markers; said actuating member being arranged to move forwardly in said frame when the planter is lifted; a rotatable latch plate for each slide block carried in the frame at the forward end thereof, said plates being interconnected and being arranged so that alternate ones thereof are effective for successive indexed positions thereof; and means operable by said actuating member for so indexing said latch plates when the planter is lifted.

5. In combination with a planter having markers pivoted to the sides thereof, and flexible marker lifter elements extending from the markers inwardly toward the center of the planter; a frame attached to the planter and extending forwardly therefrom, roller means toward the back of said frame about which said flexible elements pass and then extend forwardly in said frame, slide blocks in the frame connected to the ends of said elements; an actuating member in the frame engaging said elements on the planter side thereof movable in the frame for moving the blocks forwardly therein to pull on the said elements, and lift the markers; means connected with said actuating member for moving it forwardly in the frame when the planter is lifted, and backwardly in the frame when the planter is set down; a rotatable latch plate for each slide block in the frame at the forward end thereof, said plates being connected to turn together and being arranged so that alternating ones thereof are effective in successive indexed positions of the plates; a ratchet plate connected with said latch plates, means operated by said actuating member as the planter approaches its fully lifted position for actuating said ratchet plate to index the said latch plates; and detent means carried by the frame for preventing reversed rotation of said ratchet plate and latch plates.

6. In a marker actuating mechanism for a planter, said markers having flexible actuating elements extending inwardly toward the planter; a frame adapted for being connected at one end with the planter, roller means at the planter end of said frame about which the marker actuating elements are adapted to pass, a pair of slide blocks in said frame adapted for connection with said elements; an actuating member abuttingly engaging said slide blocks for positive movement thereof in a forward direction away from the planter to pull on said elements and lift the markers, a pair of ratchet plates in the frame, said plates being connected to turn together, and being so arranged that they are alternately effective for engaging and retaining the slide blocks in successive indexed positions of the latch plates; a ratchet plate connected with the latch plates, and means carried by the actuating member for engaging said ratchet plate in effecting the indexing of said latch plates each time the actuating member is moved forwardly in said frame to the forward limit therein.

References Cited in the file of this patent
UNITED STATES PATENTS 2,376,464     White _____ May 22, 1945